United States Patent
Clifford

(10) Patent No.: US 9,098,092 B2
(45) Date of Patent: Aug. 4, 2015

(54) BALANCED VALVE CARTRIDGE

(71) Applicant: TESCOM CORPORATION, Elk River, MN (US)

(72) Inventor: Jason D. Clifford, Brooklyn Park, MN (US)

(73) Assignee: TESCOM CORPORATION, Elk River, MN (US)

( * ) Notice: Subject to any disclaimer, the term of this patent is extended or adjusted under 35 U.S.C. 154(b) by 44 days.

(21) Appl. No.: 13/891,945

(22) Filed: May 10, 2013

(65) Prior Publication Data

US 2013/0248006 A1 Sep. 26, 2013

Related U.S. Application Data

(62) Division of application No. 12/496,868, filed on Jul. 2, 2009, now Pat. No. 8,459,297.

(51) Int. Cl.
*G05D 16/06* (2006.01)
*F16K 17/00* (2006.01)

(52) U.S. Cl.
CPC ............ *G05D 16/0666* (2013.01); *F16K 17/00* (2013.01)

(58) Field of Classification Search
CPC ............... F16K 17/00; G05D 16/0638; G05D 16/0658; G05D 16/0666
USPC .................... 137/18.19, 454.6, 505.18, 50.38, 137/505.39, 505.41, 505.42
See application file for complete search history.

(56) References Cited

U.S. PATENT DOCUMENTS

| | | | | | |
|---|---|---|---|---|---|
| 2,348,388 | A | * | 5/1944 | Jenkins | 137/505.42 |
| 2,599,577 | A | * | 6/1952 | Norgren | 137/484.8 |
| 2,707,966 | A | * | 5/1955 | Taplin | 137/116.5 |
| 2,731,975 | A | * | 1/1956 | Boals | 137/116.5 |
| 2,739,611 | A | * | 3/1956 | Cornelius | 137/505.15 |
| 2,747,607 | A | * | 5/1956 | Matasovic | 137/505.42 |
| 2,805,039 | A | * | 9/1957 | Angelery | 251/38 |
| 2,806,481 | A | * | 9/1957 | Faust | 137/116.5 |
| 2,894,526 | A | * | 7/1959 | Booth et al. | 137/116.5 |
| 2,918,081 | A | * | 12/1959 | Lauer, Jr. | 137/505.11 |
| 3,071,147 | A | * | 1/1963 | Dudzinski | 137/116.5 |
| 3,113,756 | A | * | 12/1963 | Griffo | 251/57 |
| 3,120,377 | A | * | 2/1964 | Lipschultz et al. | 366/142 |
| 3,392,749 | A | * | 7/1968 | Gneiding et al. | 137/484.6 |
| 3,545,471 | A | * | 12/1970 | Taplin | 137/116.5 |
| 3,556,125 | A | * | 1/1971 | Dowdall | 137/116.3 |
| 3,576,193 | A | * | 4/1971 | Rothfuss et al. | 137/116.5 |
| 3,586,037 | A | * | 6/1971 | Zimmer | 137/505.18 |
| 3,586,045 | A | * | 6/1971 | Zimmer | 137/595 |
| 3,606,909 | A | * | 9/1971 | Wunderlich | 137/116.3 |
| 3,643,683 | A | * | 2/1972 | Semon | 137/484.8 |
| 3,667,722 | A | * | 6/1972 | Katz | 251/30.04 |
| 3,712,333 | A | * | 1/1973 | Semon | 137/498 |
| 3,756,264 | A | * | 9/1973 | Fisher | 137/116.3 |
| 3,756,283 | A | * | 9/1973 | Angelery | 137/630.15 |
| 3,777,777 | A | * | 12/1973 | Katchka | 137/454.6 |
| 3,812,877 | A | * | 5/1974 | Fleischhacker et al. | 137/505.42 |

(Continued)

*Primary Examiner* — William McCalister

(57) ABSTRACT

A pressure reducing valve including a balanced valve cartridge. The balanced valve cartridge has a retainer including a central bore. A valve seat and a valve plug are disposed within the central bore and cooperate to open and close the valve. A cap closes one end of the central bore, the cap including a blind bore for receiving a portion of the valve plug. Downstream fluid pressure is transmitted into the blind bore through a hollow portion of the valve plug, thus balancing the valve plug within the retainer.

14 Claims, 2 Drawing Sheets

(56) References Cited

U.S. PATENT DOCUMENTS

| | | | |
|---|---|---|---|
| 3,873,063 A * | 3/1975 | Illing | 251/282 |
| 3,906,982 A * | 9/1975 | Fleischhacker et al. | 137/116.5 |
| 3,926,208 A * | 12/1975 | Hoffman | 137/484.8 |
| 4,055,198 A * | 10/1977 | Iannelli | 137/116.5 |
| 4,305,423 A * | 12/1981 | Adler | 137/505.13 |
| 4,349,136 A * | 9/1982 | Fallon et al. | 222/396 |
| 4,457,329 A * | 7/1984 | Werley et al. | 137/73 |
| 4,693,267 A * | 9/1987 | Patterson | 137/116.5 |
| 4,719,940 A * | 1/1988 | Beavers | 137/505.39 |
| 4,760,862 A * | 8/1988 | Mutou et al. | 137/315.05 |
| 5,285,810 A * | 2/1994 | Gotthelf | 137/340 |
| 5,339,857 A * | 8/1994 | Scallan et al. | 251/38 |
| 5,358,004 A * | 10/1994 | Atkinson et al. | 137/505.18 |
| 5,443,083 A * | 8/1995 | Gotthelf | 137/484.8 |
| 6,079,434 A * | 6/2000 | Reid et al. | 137/14 |
| 6,382,243 B2 * | 5/2002 | Hiddessen et al. | 137/505.18 |
| 6,820,641 B2 * | 11/2004 | Larsen | 137/491 |
| 6,932,108 B2 * | 8/2005 | Hecking | 137/505 |

\* cited by examiner

BALANCED VALVE CARTRIDGE

FIELD OF THE DISCLOSURE

The disclosure generally relates to balanced pressure regulating valves and specifically to a balanced valve cartridge that may be mounted into a housing of a balanced or unbalanced pressure regulating valve body.

BACKGROUND OF THE DISCLOSURE

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

One way to minimize the decaying inlet characteristic is to minimize the difference between inlet and outlet pressure. Thus, multiple stage unbalanced pressure regulators, where each stage only reduces the pressure by a small amount, are less subject to the decaying inlet pressure characteristic. Multi-stage unbalanced pressure regulators are typically well suited for relatively low flow applications.

To address the decaying inlet characteristic in higher flow applications, balanced pressure regulating valves were developed. In the balanced valve, a portion of the downstream pressure is vented to act on an upstream portion of the valve plug. Thus, the valve plug is "balanced," having the same fluid pressure act on both upstream and downstream portions of the valve plug. In this way, the decaying inlet characteristic is eliminated (or greatly reduced) because there is no difference in the fluid forces acting on valve plug surfaces both upstream and downstream of the valve seat that would tend to force the valve plug towards the closed position. In other words, the valve plug itself generates very little, or no opening/closing forces due to fluid pressures.

Recently, some unbalanced pressure reducing valves have been developed that include a valve cartridge. The valve cartridge may be assembled as a sub-assembly. The valve cartridge may then be installed into an unbalanced valve body as a unit. Some unbalanced valve cartridges include a valve plug, a valve seat, a retaining body, and a filter on the high pressure side of the valve plug. Because fluid flowing through the unbalanced cartridge is filtered the life of the unbalanced valve cartridge may be extended and reliability and precision of the unbalanced pressure regulating valve may be improved. While such valve cartridges have improved assembly and durability, these valve cartridges have been limited to unbalanced pressure reducing valves due to manufacturing and cost limitations.

SUMMARY

A pressure reducing valve includes a balanced valve cartridge. The balanced valve cartridge has a retainer including a central bore. A valve seat and a valve plug are disposed within the central bore and cooperate to open and close the valve. A cap closes one end of the central bore, the cap includes a blind bore for receiving a portion of the valve plug. Downstream fluid pressure is transmitted into the blind bore through a hollow portion of the valve plug, thus balancing the valve plug within the retainer.

Figure 1:
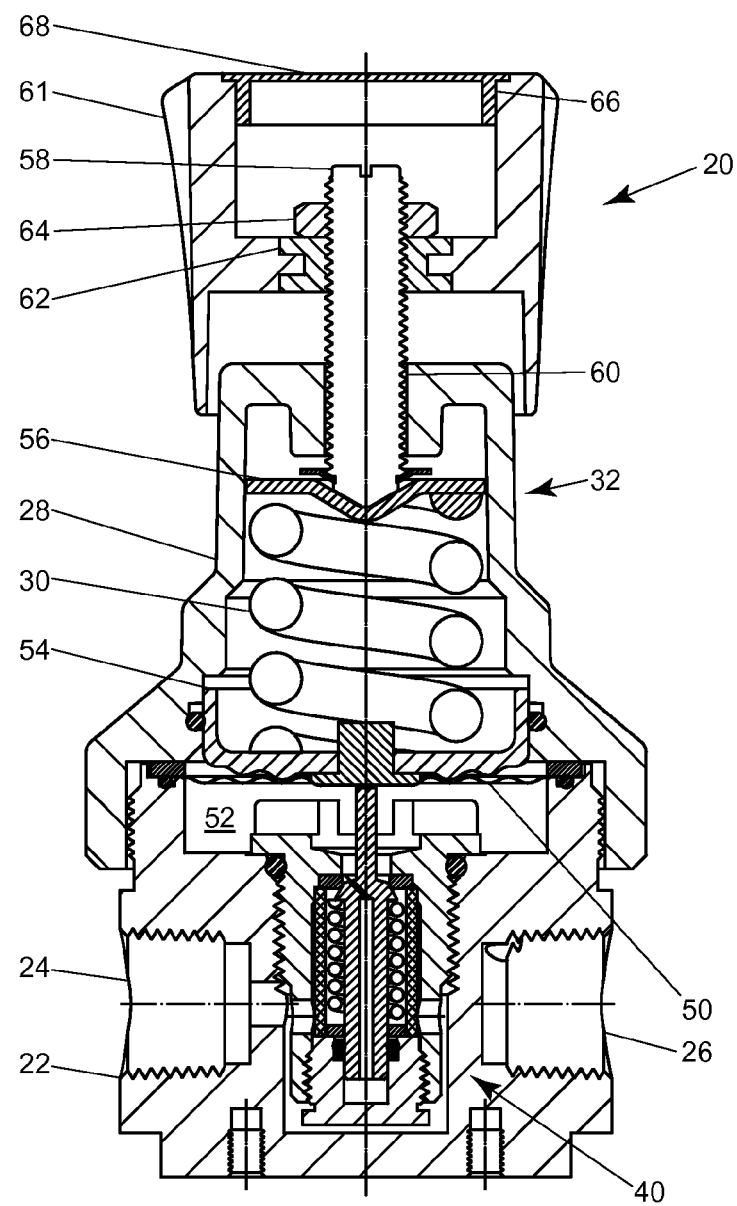
FIG. 1 is a cross-sectional view of a pressure reducing valve having a balanced valve cartridge constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION OF THE DISCLOSURE

Referring now to the drawings and with specific reference to FIG. 1, a pressure regulating valve is generally referred to by reference numeral 20. The pressure regulating valve 20 includes a valve body 22 having a fluid inlet 24 and a fluid outlet 26. The valve body 22 may in one embodiment be capable of housing a typical unbalanced valve cartridge (not shown). A bonnet 28 houses a load spring 30 and a set point adjusting mechanism 32. A balanced valve cartridge 40 is located within the valve body 22 between the fluid inlet 24 and the fluid outlet 26 to regulate downstream fluid pressure.

The valve 20 includes a diaphragm 50 that is responsive to downstream pressure in chamber 52. The diaphragm 50 is movable within the bonnet 28. The diaphragm 50 is movable up and down in FIG. 1 and is located at a position in which force on the diaphragm 50 generated by the outlet fluid pressure in chamber 52 is balanced with a force on the diaphragm generated by the load spring 30. The diaphragm 50 may be supported and/or reinforced by a diaphragm plate 54. The diaphragm plate 54 both supports the diaphragm 50 and acts as a force transfer mechanism to transfer force from the load spring 30 to the diaphragm 50. The load spring 30 seats between the diaphragm plate 54 and a spring button 56. An adjustment screw 58 is disposed in an opening 60 in the bonnet 28. The adjustment screw 58 is displaceable within the opening 60 so that one end of the adjustment screw 58 abuts against the spring button 56. Movement of the adjustment screw changes a location of the spring button 56 within the bonnet 28 and thus, the spring force acting on the diaphragm plate 54 from the load spring 30 may be modified. In this way, a set point of the pressure reducing valve 20 may be adjusted.

To facilitate adjustment of the adjustment screw 58, the adjustment screw 58 may be connected to a hand knob 61 by a hand knob insert 62, and a nut 64. Access to the nut 64 may be available through an opening 66 in the hand knob 61, which may be covered by a hole plug 68.

Figure 2:
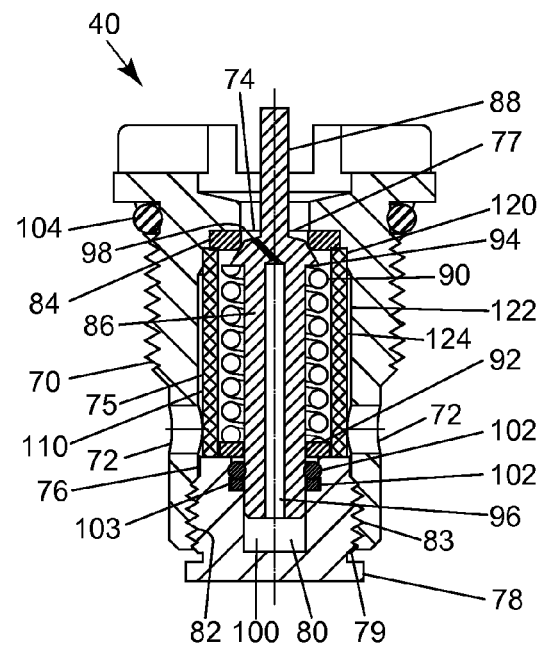
FIG. 2 is an enlarged cross-sectional view of the balanced valve cartridge of FIG. 1.

As seen in FIG. 2, the balanced valve cartridge 40 includes a retainer 70 having a fluid inlet 72, a fluid outlet 74, and a central bore 75 having a first end 77 and a second end 79. The retainer 70 may include an opening 76 opposite the fluid outlet 74. A cap 78 may close (and optionally seal) the opening 76. The cap 78 may include a blind bore 80 opening towards the fluid outlet 74. The cap 78 may also include a threaded portion 82 that cooperates with a threaded portion 83 on an inner surface of the retainer 70 to secure the cap 78 over the opening 76. Alternatively, the cap 78 may be crimped onto the retainer 70.

A valve seat 84 may be disposed within the retainer 70 proximate the fluid outlet 74. A valve plug 86 is disposed within the retainer 70 and the valve plug 86 is movable within the central bore 75 of the retainer 70 to cooperate with the valve seat 84 to regulate fluid flow through fluid outlet 74. The valve plug 86 includes a stem portion 88 that cooperates with the diaphragm 50 (FIG. 1) to position the valve plug 86 within the retainer 70. A spring 90 is located between the valve plug 86 and the cap 78 to bias the valve plug 86 towards a closed position. Optionally, a washer 92 may be disposed against the cap 78 to act as a seat for one end of the spring 90 and to protect and retain one or more seals 102. An opposite end of the spring 90 may seat against the valve plug 86 at a shoulder 94 of the valve plug 86. The valve plug 86 may include a hollow center portion 96 and an angled vent portion 98. The angled vent portion 98 has an inlet on the downstream side of the valve seat 84 and an outlet connected to the hollow center portion 96. The hollow center portion 96, in turn, has an inlet connected to the outlet of the angled vent portion 98, and an outlet that vents downstream valve pressure into a void 100 located between the valve plug 86 and the cap 78. The angled vent portion 98 and the hollow center portion 96 cooperate to allow downstream pressure into the void 100 in the cap 78 created by the blind bore 80 and the valve plug 86. In this way, the valve plug 86 becomes a balanced valve plug, thus reducing or eliminating decaying inlet characteristic and reducing force on the valve seat 84 due to inlet pressure.

The void 100 may be sealed from inlet pressure by the one or more seals 102, such as o-rings, disposed within an annular recess 103 in the blind bore 80. Likewise, the retainer 70 may be sealed against the valve body by one or more seals 104, such as o-rings. Of course, any other type of known seal may be used depending on the use and requirements of the valve 20.

A sealing means, such as a filter 110 may be disposed within the retainer 70 between an inner surface of the retainer 70 and the valve plug 86. The filter 110 may be secured in the retainer 70 between the cap 78 and the valve seat 84. An inner surface of the retainer 70 may include a first portion 120 and a second portion 122. The first portion 120 may have a smaller diameter than the second portion 122 so that a gap 124 is created between the filter 110 and the second portion 122, while the filter 110 is held in place laterally by the first portion 120. The gap 124 may allow fluid to flow lengthwise along the filter 110, thus making a larger portion of the filter 110 available for fluid to flow through. As a result, the valve plug 86, valve seat 84, and spring 90 are all protected from contaminants and impurities by the filter 110. This feature increases the life expectancy and precision of the pressure reducing valve 20.

The filter 110 also compresses and seals the valve seat 84 against the inner surface of the retainer 70. As a result, inlet fluid pressure is prevented from passing the valve seat 84 between the valve seat 84 and the retainer 70. Other means of sealing the valve seat 84 with the retainer 70 are possible including, but not limited to, using a separate part (not shown) to apply a sealing force to the valve seat 84, and installing a seat retainer (not shown) between the valve seat 84 and the retainer 70.

Figure 3:
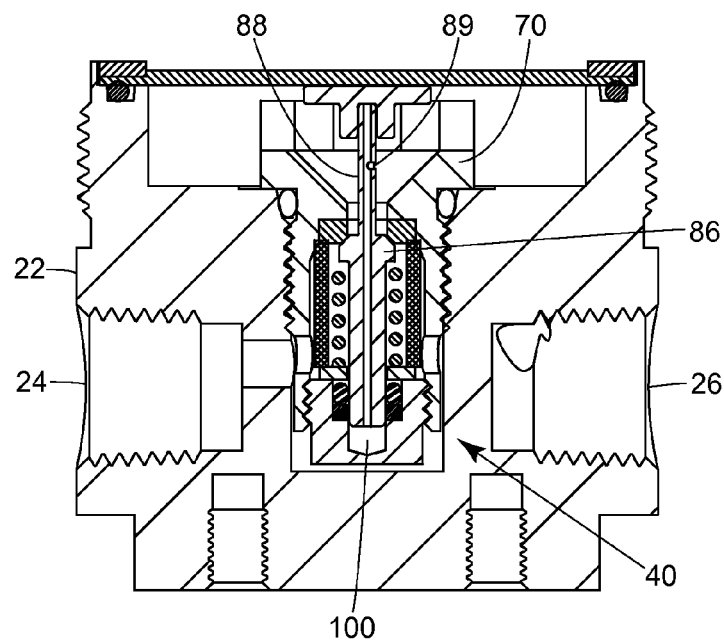
FIG. 3 is a cross-sectional view of an alternate embodiment of a balanced valve cartridge constructed in accordance with the teachings of the disclosure.

In an alternate embodiment shown in FIG. 3, the valve plug 86 includes a hollow stem 88. The stem 88 also may include an opening 89. Outlet fluid pressure may be transmitted through the opening 89 and into the hollow stem 88 and finally through the valve plug 86 into the void 100.

As opposed to prior art unbalanced valve cartridges, the balanced valve cartridge of the present disclosure may be installed in a typical unbalanced valve body. Thus, manufacturing and logistic efficiency is improved because a single valve body may be changed from an unbalanced valve to a balanced valve simply by changing the valve cartridge.

In one embodiment, an unbalanced pressure regulating valve may be converted to a balanced pressure regulating valve by 1) removing an unbalanced valve cartridge from a valve body, and 2) inserting a balanced valve cartridge according to the disclosure within the valve body.

From the forgoing, one of ordinary skill in the art will readily understand that through the teachings of the disclosure, a pressure reducing valve can be constructed having a removable balanced valve cartridge. Moreover, a pressure reducing valve may be changed from an unbalanced valve to a balanced valve quickly and easily.

What is claimed is:

1. A method of converting an unbalanced valve to a balanced valve, the method comprising:
   obtaining an unbalanced valve comprising a valve body and an unbalanced valve cartridge;
   providing a balanced valve cartridge comprising:
      a retainer having a central bore including a first end and a second end, an inner surface, and at least one opening in the inner surface forming a fluid inlet;

a valve seat disposed within the central bore proximate the first end of the central bore;

a movable valve plug at least partially disposed within the central bore, the movable valve plug selectively opening and closing the first end of the central bore by sliding within the central bore to cooperate with the valve seat, the movable valve plug having a hollow center portion;

a sealing means disposed within the central bore between the inner surface of the central bore and the valve plug; and an end cap disposed at the second end of the central bore, the end cap closing the second end of the central bore, the end cap including a blind bore facing the valve plug, the blind bore receiving one end of the valve plug so that the blind bore is fluidly connected to a downstream side of the valve seat by the hollow center portion of the valve plug;

wherein the end cap plugs the second end of the central bore and traps the filter against the valve seat, thereby fixing the filter within the central bore and trapping the filter and valve plug between the end cap and the retainer;

removing the unbalanced valve cartridge from the valve body; and inserting the balanced valve cartridge into the valve body.

2. The method of claim 1, wherein the step of inserting the balanced valve cartridge includes threading the outer surface of the end cap into the retainer.

3. The method of claim 1, further comprising the step of venting downstream pressure through the hollow center portion of the movable valve plug and into the blind bore of the end cap.

4. The method of claim 1, further comprising the step of sealing the annular bore by disposing a seal within an annular recess near an open end of the blind bore.

5. The method of claim 1, wherein the balanced valve cartridge comprises a spring trapped between the end cap and the valve plug, the spring biasing the valve plug towards the valve seat.

6. The method of claim 5, wherein a washer is disposed between the spring and the end cap.

7. The method of claim 1, wherein the blind bore includes an annular recess near an open end of the blind bore.

8. The method of claim 7, wherein a seal is disposed in the annular recess, the seal being trapped between the end cap and the valve plug.

9. The method of claim 1, wherein an outer surface of the end cap includes a threaded portion and the inner surface of the retainer includes a threaded portion, the threaded portion of the end cap and the threaded portion of the retainer cooperating to attach the end cap to the retainer.

10. The method of claim 1, wherein a valve stem is attached to a first end of the valve plug, the valve stem extending out of the first end of the central bore on a downstream side of the valve seat.

11. The method of claim 10, wherein the hollow center portion of the valve plug extends into the valve stem.

12. The method of claim 1, wherein the hollow center portion of the valve plug is connected with an angled relief portion, the angled relief portion and the hollow center portion cooperating to fluidly connect the blind bore and a downstream side of the valve seat.

13. The method of claim 1, wherein the inner surface of the central bore includes a first portion and a second portion, wherein the first portion has a smaller diameter than the second portion.

14. The method of claim 13, wherein the sealing means is disposed immediately adjacent the first portion of the inner surface of the central bore and the second portion of the inner surface of the central bore forms an annular space between the filter and the inner surface of the central bore.

* * * * *